US006891162B2

(12) United States Patent
Nagoshi et al.

(10) Patent No.: US 6,891,162 B2
(45) Date of Patent: May 10, 2005

(54) METHOD OF ACQUIRING DATA FROM MULTI-ELEMENT DETECTOR IN INFRARED IMAGING APPARATUS

(75) Inventors: Toshiyuki Nagoshi, Hachioji (JP); Seiichi Kashiwabara, Hachioji (JP); Jun Koshoubu, Hachioji (JP)

(73) Assignee: Jasco Corporation, Hachioji (JP)

( * ) Notice: Subject to any disclaimer, the term of this patent is extended or adjusted under 35 U.S.C. 154(b) by 161 days.

(21) Appl. No.: 10/355,295

(22) Filed: Jan. 31, 2003

(65) Prior Publication Data

US 2003/0146386 A1 Aug. 7, 2003

(30) Foreign Application Priority Data

Feb. 4, 2002 (JP) ........................................ 2002-026991

(51) Int. Cl.[7] .................................................. G01J 5/02
(52) U.S. Cl. .................................. 250/339.08; 356/454
(58) Field of Search ....................... 250/339.08, 339.07, 250/339.09, 328, 282, 288; 356/454, 451, 452, 486, 519, 51, 73

(56) References Cited

U.S. PATENT DOCUMENTS 4,999,010 A * 3/1991 Mattson et al. ............. 356/451
5,914,780 A * 6/1999 Turner et al. ............... 356/451

* cited by examiner

*Primary Examiner*—Otilia Gabor
(74) *Attorney, Agent, or Firm*—Oliff & Berridge PLC

(57) ABSTRACT

A method capable of acquiring data at a high speed while holding proper precision during measurement with an infrared imaging apparatus uses an FTIR device of a continuous scan type for detecting a signal by a multi-element detector. A method which acquires data from a multi-element detector in an infrared imaging apparatus. The method involves starting to scan an element of the said multi-element detector synchronously with a sampling signal based on a reference signal of an interferometer, and scanning the element at a higher frequency than a sampling frequency of the sampling signal. The method further involves completing the scanning of all the elements before a next sampling signal to the sampling signal starting the element scanning is generated, and repeating a series of operations every time the sampling signal is generated.

3 Claims, 5 Drawing Sheets

US 6,891,162 B2

METHOD OF ACQUIRING DATA FROM MULTI-ELEMENT DETECTOR IN INFRARED IMAGING APPARATUS

RELATED APPLICATIONS

This application claims priority to the Japanese Patent Application No. 2002-26991 filed on Feb. 4, 2002, and is hereby incorporated with reference for all purposes.

BACKGROUND OF THE INVENTION

1. Field of the Invention

The present invention relates to a method of acquiring data from a multi-element detector in an infrared imaging apparatus, and more particularly to an improvement in a method of shortening a time required for measurement.

2. Prior Art

A multi-element detector using an MCT or an InSb is referred to as a Focal Plane Array (FPA) detector, and has a mechanism for scanning a photoelectric output from each element arranged one-dimensionally or two-dimensionally and is utilized for a detecting device of an infrared imaging apparatus. The FPA detector has the scanning mechanism of each element output by an MOSFET circuit and can therefore scan the elements in MHz order. If the scanning speed can be utilized, sampling can be carried out at a high speed.

In an infrared imaging apparatus comprising a Fourier transform infrared spectroscopic (FTIR) device for detecting a signal by means of the FPA detector, a light incident from a light source of the FTIR device becomes interferogram by an interferometer and is irradiated onto a sample. The light transmitted through the sample is photoelectrically converted by an FPA detector and thus generates an analog electric signal. The analog electric signal is converted into a digital signal by an A/D converter and is then transmitted to a computer, and is stored as digital data in a memory. The data are subjected to an arithmetic processing by a CPU and an infrared image of the sample is then displayed on the display based on image data obtained finally.

In an FTIR device of a continuous scan type, an interference signal of a laser modulated with the movement of a movable mirror included in an interferometer is used as a reference signal in order to accurately locate the position of the movable mirror, and the output of a detector is sampled synchronously with a sampling signal based on the reference signal.

In the case where the FPA detector is used as the detector of the FTIR device of a continuous scan type, however, the performance of the FPA detector capable of being scanned at a speed in MHz order cannot fully be exhibited because the frequency of the sampling signal is on the order of KHz when the sampling of each element is carried out synchronously with the sampling signal based on the said reference signal.

In order to carry out the sampling, the accuracy of which is correlated with the position of the movable mirror of the interferometer, there is only a method utilizing the reference signal. For example, even if the sampling is to be carried out by utilizing an internal signal in MHz order of the FPA detector, the correlation between the sampling signal and the position of the movable mirror of the interferometer cannot be taken with high precision. As a result, accurate measurement cannot be carried out.

If the outputs of all elements are read by a step scan operation, the above-mentioned problem can be avoided. However, an FTIR device of a step scan type is expensive. Therefore, there has been desired a high-speed data acquiring method of using a continuous scan type, which is available more inexpensively, to hold proper precision and to make the best of the performance of the FPA detector.

SUMMARY OF THE INVENTION

The present invention has an object to provide a method capable of acquiring data at a high speed while holding proper precision in measurement in an infrared imaging apparatus comprising an FTIR device of a continuous scan type for detecting a signal by a multi-element detector.

In order to solve the said problems, the present invention provides a method of acquiring data from a multi-element detector in an infrared imaging apparatus including a Fourier transform infrared spectroscopic device of a continuous scan type for detecting a signal by the multi-element detector, comprising the steps of:

starting to scan an element of the said multi-element detector synchronously with a sampling signal based on a reference signal of an interferometer;

scanning the element at a higher frequency than a sampling frequency of the sampling signal;

completing the scanning of all the elements before a next sampling signal to the sampling signal starting the element scanning is generated; and repeating a series of operations every time the sampling signal is generated.

In this invention, it is preferable that the scanning frequency is on the order of MHz and the sampling frequency is on the order of KHz. Consequently, it is possible to scan all elements of a multi-element detector comprising several ten to several hundred million elements between each sampling signal.

DETAILED DESCRIPTION OF THE PREFERRED EMBODIMENT

An embodiment of the present invention will be described below with reference to the drawings.

Figure 5:
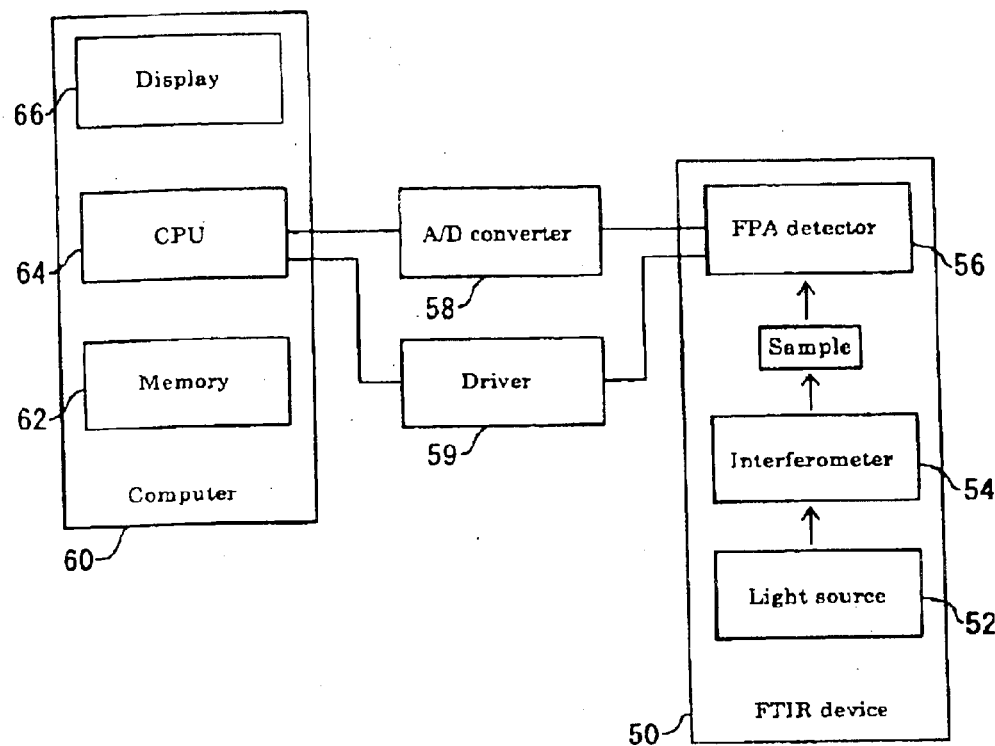
FIG. 5 is an explanatory diagram schematically showing the signal path of an infrared imaging apparatus.

FIG. 5 schematically shows the signal path of an infrared imaging apparatus comprising a Fourier transform infrared spectroscopic (FTIR) device for detecting a signal by means of the FPA detector. In FIG. 5, a light incident from a light source 52 of the FTIR device 50 becomes interferogram by an interferometer 54 and is irradiated onto a sample. The light transmitted through the sample is photoelectrically converted by an FPA detector 56 and thus generates an analog electric signal. The analog electric signal is converted into a digital signal by an A/D converter 58 and is then transmitted to a computer 60, and is stored as digital data in a memory 62. There is provided a driver circuit 59 for controlling the A/D conversion of a measurement value for any element in the FPA detector 56 in response to a signal sent from a CPU. The driver 59 selects signal of which element in FPA detector 59 to be converted into digital data. The data are subjected to an arithmetic processing by arithmetic unit 64 such as a CPU and an infrared image of the sample is then displayed on the display 66 based on image data obtained finally.

In an FTIR device of a continuous scan type, an interference signal of a laser modulated with the movement of a movable mirror included in an interferometer used as a reference signal in order to accurately locate the position of the movable mirror, and the output of a detector is sampled synchronously with a sampling signal based on the reference signal.

Figure 6:
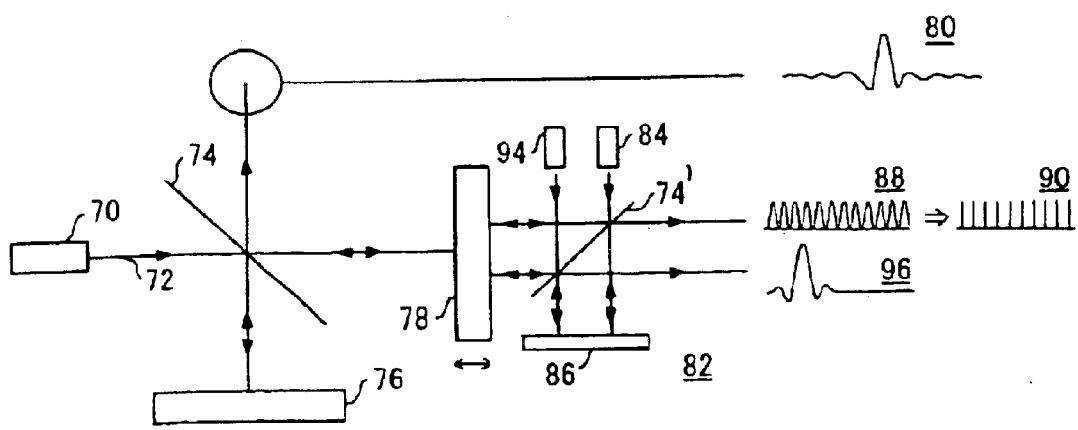
FIG. 6 is an explanatory diagram schematically showing the structure of an interferometer.

FIG. 6 shows an example of the structure of the interferometer provided in the FTIR device of a continuous scan type. An infrared light 72 emitted from a light source 70 is divided into a fixed mirror 76 direction and a movable mirror 78 direction by a beam splitter 74. Lights reflected by the fixed mirror 76 and the movable mirror 78 are superposed again by the beam splitter 74 so that an interference light 80 (interferogram) is generated by an optical path difference corresponding to the position of the movable mirror 78 moving at a constant speed.

On the other hand, there is provided an interferometer 82 referred to as a subinterferometer for correlating the sampling of the interference light 80 transmitted through the sample and the optical path difference. A monochromatic light 84 of a He—Ne laser or the like is introduced into the interferometer 82 so that an interference light 88 is generated by an optical path difference between the fixed mirror 86 and the movable mirror 78. The interference light 88 is based on the monochromatic light and a detected signal of the interference light 88 is therefore sine wave-shaped. A detected electric signal is converted into a comb-shaped signal 90 shown in FIG. 6, for example, and a signal indicative of sampling is obtained so that the said optical path difference can be specified during the sampling. Moreover, a white light 94 is also introduced into the interferometer 82. The monochromatic light 84 and the white light 94 are divided into the fixed mirror 86 direction and the movable mirror 78 direction by a beam splitter 74. Consequently, a point at which the intensity of an interference light is a maximum can be set to be the reference of a position as a position where the optical path difference is zero.

Figure 1:
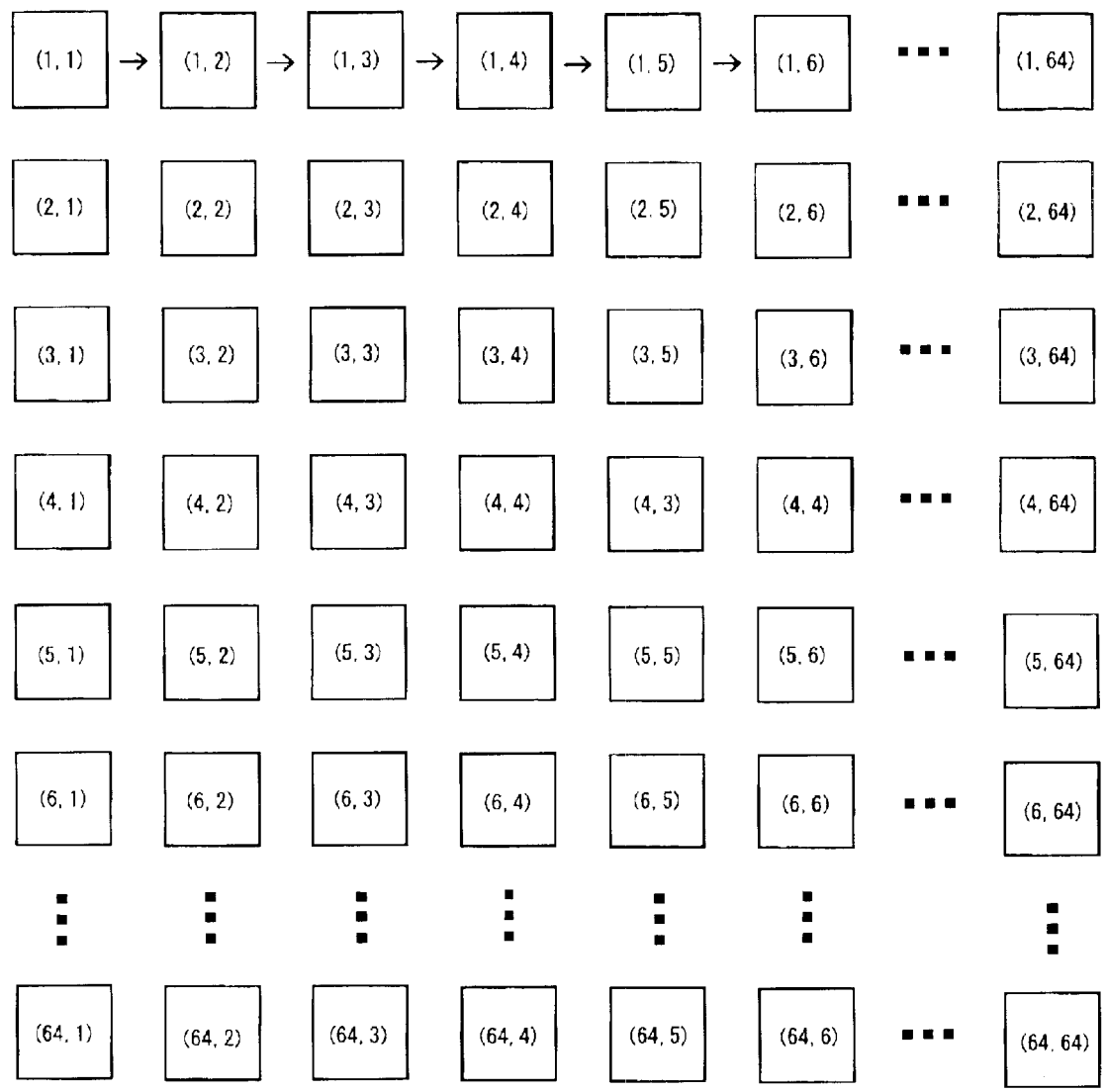
FIG. 1 is a diagram showing an example of the element array of an FPA detector.

FIG. 1 shows an example of the element array of an FPA detector. At time of measurement, (1, 1), (1, 2) . . . (1, 64) are scanned in order from each element on a first row. Next, (2, 1), (2, 2) . . . (2, 64) are scanned in order for each element on a second row. Similarly, the scanning is carried out in order for each element on 3 to 64 rows.

As described above, the FPA detector can carry out the scanning in MHz order. In the case in which the FPA detector is used as the detector of an FTIR device of a continuous scan type, however, an accurate correlation with the position of a movable mirror can be taken by only a sampling signal in KHz order based on the reference signal of an interferometer. For example, even if the internal signal of the FPA detector is exactly utilized to carry out the whole measurement, the measurement cannot be performed with high precision.

Figure 2:
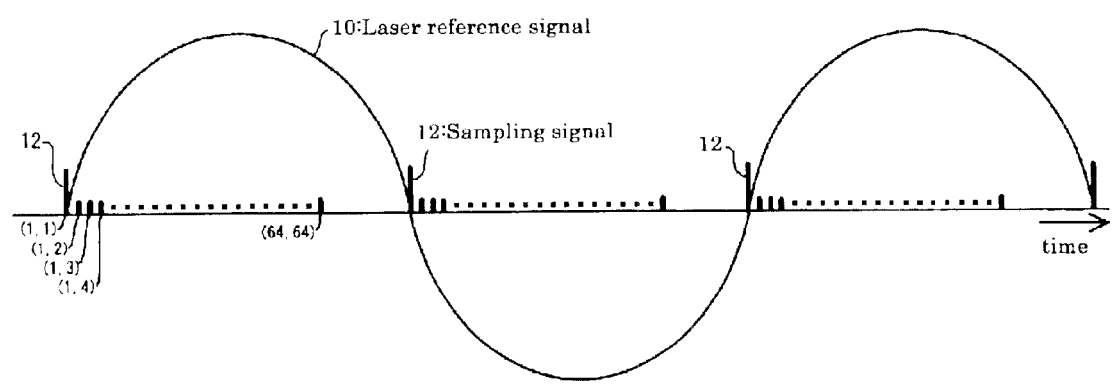
FIG. 2 is an explanatory diagram showing a method according to the present invention.

The present inventors vigorously investigated a method of acquiring data which makes the best of the scanning speed of the FPA detector with sufficient precision in measurement and found the following method as a result of the investigations. FIG. 2 schematically shows sampling to be carried out by the method according to the present invention by taking, as an example, the case in which the detector of FIG. 1 is used. In FIG. 2, a laser reference signal 10 generates a sampling signal 12 in KHz order corresponding to the position of the movable mirror of the interferometer.

In the present invention, the scanning of the FPA detector is started synchronously with the sampling signal 12. For example, if the internal signal of a detector circuit is utilized to carry out the scanning at a higher frequency than the frequency of the sampling signal 12, the correlation with the position of the movable mirror of the interferometer is maintained.

More specifically, if the sampling is carried out at regular intervals with the constant frequency of a scanning signal, the scanning point of each element can be specified in correlation to the position of the movable mirror of the interferometer. Consequently, the sampling of all elements can be carried out.

Before a next sampling signal to the sampling signal starting the element scanning is generated, all the elements are completely scanned. Every time the sampling signal is generated, a series of operations are repeated. Thus, the whole sampling is carried out.

A time interval may be set between the time of the completion of the element scanning and the next sampling signal. For example, it is possible to scan all elements of an FPA detector comprising approximately several ten to several million elements between each sampling signal.

In the case where there are several thousands to several millions of elements and the scanning frequency of EPA detector is 1–50 MHz, it is preferable that the sampling frequency is from several ten Hz to several ten KHz. For example, in the case where the FPA detector has (64×64) elements and its scanning frequency is 50 Mhz, it is preferable that the sampling frequency is less than 10 KHz.

Thus, it is possible to hold proper precision in measurement and to make the best of the performance of the FPA detector, thereby acquiring data at a high speed. For example, in the case in which a detector comprising a single element is conventionally used, a signal sent from the element is detected for each sampling signal 12. According to the method of the present invention, however, all elements are scanned for each sampling signal 12. For this reason, a multi-element detector can carry out the whole sampling at a speed which is the same as a sampling time in the conventional detector comprising a single element.

The present inventors also found that the following method can be applied to a method of acquiring data from a detector when obtaining an infrared image by using an FPA detector as the detector of an FTIR device. This method will be described below.

In the case in which an infrared image is to be obtained by using the FPA detector, all the elements of the FPA detector are scanned by the driver as a switching circuit to obtain an image with each of the elements set to be each point.

However, a fine image with each of the element set to be each point is not always required depending on the purpose and object of measurement.

Moreover, a reduction in a time taken for measurement is more required than picture quality in some cases.

On the other hand, in the case in which the image of a part of a measuring object is to be rapidly obtained in place of the whole measuring object, the method of scanning all the elements is not suitable.

As a result of investigations to shorten the time taken for measurement when obtaining an infrared image by using the FPA detector, there was found a method of acquiring data from a multi-element detector in an infrared imaging apparatus comprising a Fourier transform infrared spectroscopic device for detecting a signal by a multi-element detector, comprising the steps of selecting an element to be scanned from the array of all elements of the said multi-element detector and scanning only the element thus selected; and setting, as image data, data sent-from the scanned element.

In the said method, it is suitable that the element to be scanned should be selected at a regular interval.

In the said method, it is suitable that an element within a range corresponding to a measured portion of a measuring object should be selected.

The above-mentioned method will be described below.

An infrared imaging apparatus to which the above-mentioned method is applied has a structure shown in FIG. 5, for example.

Figure 3:
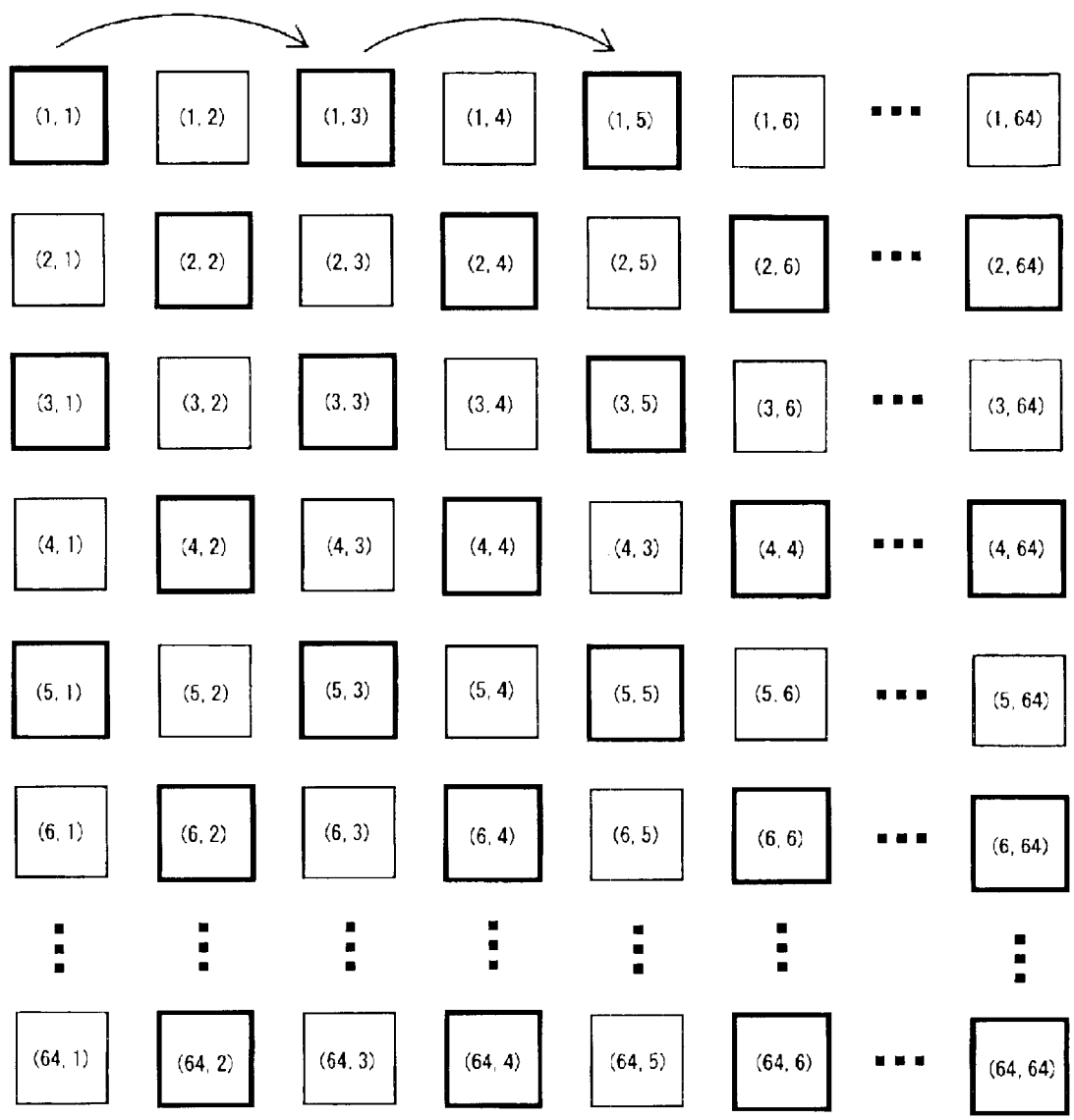
FIG. 3 is an explanatory diagram showing a method of acquiring data from a detector when obtaining an infrared image by using the FPA detector as the detector of an FTIR device.
Figure 4:
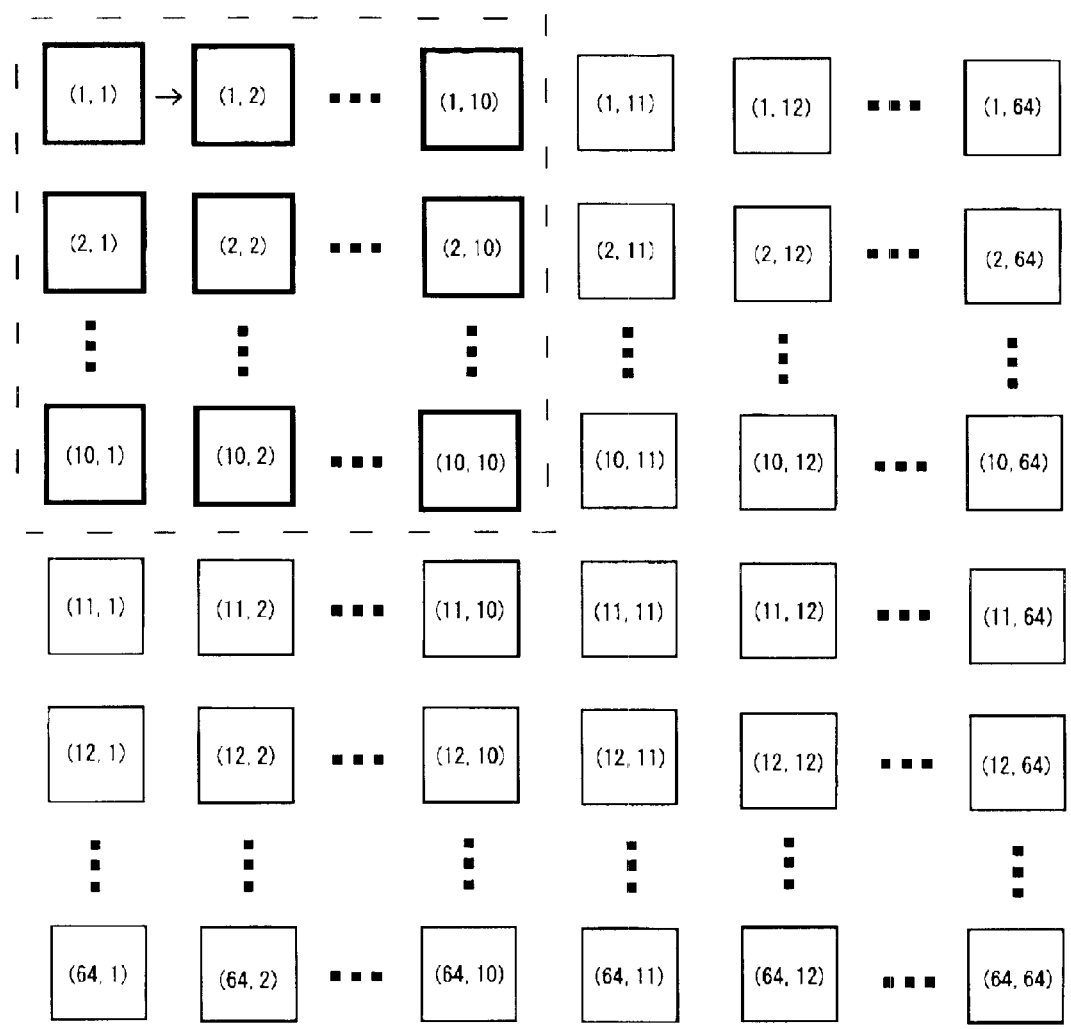
FIG. 4 is an explanatory diagram showing a method of acquiring data from a detector when obtaining an infrared image by using the FPA detector as the detector of the FTIR device.

FIGS. 3 and 4 are schematic diagrams illustrating the above-mentioned method together with the array of the elements of the FPA detector. In a method shown in FIG. 3, all the elements are not scanned but data are acquired from the elements selected uniformly at a regular interval. More specifically, in FIG. 3, a first row is alternately scanned, a second row is alternately scanned. In other words, (1,1), (1,3), (1,5), . . . are scanned in this order on the first row and (2,2), (2,4), (2,6), . . . are scanned in this order on the second row. The scanning is carried out for 3 to 64 rows in the same manner to acquire data. Data acquired from the scanned element are set to be image data and an image is obtained based on this image data.

Such a scanning method can be carried out by setting the driver of a switching circuit. If the data are thus acquired, picture quality is theoretically deteriorated as compared with the case in which data are acquired from all the elements. However, the image is visually sufficient in some cases. Moreover, the scanning method is effective in the case in which a reduction in a time taken for measurement is more required than high picture quality.

The interval of the elements and the like are properly determined depending on the purpose of the measurement.

In a method shown in FIG. 4, all the elements are not scanned but elements within a range corresponding to a measured portion of a measuring object are selected and scanned to acquire data. FIG. 4 shows an example in which data are acquired from the elements on 1 to 10 columns in a transverse direction and 1 to 10 rows in a vertical direction. Data acquired from the scanned element are set to be image data and an image is obtained based thereon.

In such a method of acquiring data, if it is sufficient that only the image of a part of the measuring object is obtained, necessary data can be acquired efficiently and the time taken for measurement can be shortened.

According to the method described above, it is possible to produce an advantage that data can be acquired efficiently and the time taken for measurement can be shortened.

As described above, according to the method of the present invention, it is possible to acquire data at a high speed while holding proper precision in measurement.

What is claimed is:

1. A method of acquiring data from a multi-element detector in an infrared imaging apparatus including a Fourier transform infrared spectroscopic device of a continuous scan type for detecting a signal by the multi-element detector, comprising the steps of:

starting to scan an element of the said multi-element detector synchronously with a sampling signal based on a reference signal of an interferometer;

scanning the element at a higher frequency than a sampling frequency of the sampling signal;

completing the scanning of all the elements before a next sampling signal to the sampling signal starting the element scanning is generated; and repeating a series of operations every time the sampling signal is generated.

2. The method of claim 1 wherein the scanning frequency is on the order of MHz and the sampling frequency is on the order of KHz.

3. The method of claim 2 wherein the multi-element detector has from several ten to several million elements.

* * * * *